United States Patent [19]
Azumi

[11] Patent Number: 5,650,702
[45] Date of Patent: Jul. 22, 1997

[54] CONTROLLING SYSTEM FOR SELF-PROPELLED FLOOR CLEANING VEHICLES

[75] Inventor: Yasuhiro Azumi, Hadano, Japan

[73] Assignee: S. C. Johnson & Son, Inc., Racine, Wash.

[21] Appl. No.: 498,708

[22] Filed: Jul. 3, 1995

[30] Foreign Application Priority Data

Jul. 7, 1994 [JP] Japan .................. 6-155896

[51] Int. Cl.$^6$ .............. A47L 11/24; G05D 3/14; H02P 7/00
[52] U.S. Cl. .......... 318/587; 318/268; 318/480; 15/340.1
[58] Field of Search ............ 318/580, 587, 318/139, 268, 272, 480; 15/300.1, 319, 327.1, 340.1

[56] References Cited

U.S. PATENT DOCUMENTS

| 5,323,483 | 6/1994 | Baeg ................ 388/811 |
| 5,551,119 | 9/1996 | Worwag ............ 15/319 |

FOREIGN PATENT DOCUMENTS

| 57-128119 | 8/1982 | Japan . |
| 2-56610 | 2/1990 | Japan . |
| 3-237958 | 10/1991 | Japan . |
| 4-314345 | 5/1994 | Japan . |

*Primary Examiner*—Bentsu Ro

[57] ABSTRACT

This invention provides an improved method and system for controlling a self-propelled floor cleaning vehicle characterized by the fact that the vehicle has excellent cleaning performance. This method is applied to a floor cleaning vehicle that follows a guidance line located on the floor. It detects the level of dirt or scratching present on the floor and it controls the running speed of the floor cleaning vehicle corresponding to the amount of the dirt or scratching detected. It is thus able to modify the cleaning and polishing/buffing operation in response to the amount of dirt or scratching on the floor.

19 Claims, 4 Drawing Sheets

CONTROLLING SYSTEM FOR SELF-PROPELLED FLOOR CLEANING VEHICLES

BACKGROUND OF THE INVENTION

1. Field of the Invention

This invention pertains to a method and device for controlling a self-propelled floor cleaning vehicle for cleaning the floors of buildings, etc.

2. Related Background Art

Usually, a self-propelled cleaning vehicle is guided by means of a reflective tape bonded onto the floor to be cleaned as described in Japanese Published Patent Application No. 57-128119 to Isamu. However, the reflective tape detracts from the appearance of the floor. Also, as the reflective tape is worn or peeled, the cleaning vehicle cannot be guided correctly. Consequently, the tape has to be changed frequently. This is a disadvantage.

In order to solve the aforementioned problem, the present inventor proposed a new method for guiding a floor cleaning vehicle without using the reflective tape in Japanese Published Patent Application No. 06-149350 published on May 27, 1994 which corresponds to U.S. Pat. No. 5,622,236, entitled "Guidance System for Self Advancing Vehicle" in the names of Yasuhiro Azumi and Mitsuo Sado, the latter of which is hereby incorporated by reference.

In the Azumi and Sado guidance system, a material containing a light-emitting dye is applied on the floor to form a guidance line, on which multiple layers of floor wax or other finishing agent is coated overall on the floor, and the cleaning vehicle is guided along the guidance line.

This method can be used to solve the aforementioned problem.

However, just as in the aforementioned conventional method using reflective tape, since the amount of dirt on the floor is not uniform, dirt may cover portions of the floor coated with the finishing agent, and the gloss of the floor surface may be lost in some areas due to multiple scratches on the finishing agent on the floor surface. Consequently, the dirt may not be cleaned off at a high level of efficiency if the cleaning vehicle runs at a constant speed. In this case, the aforementioned problem is still not solved.

Japanese Published Patent Application No. Hei 2[1990]-56610 to Toshihiro et al. teaches an optical guidance system for moving vehicles. A guide path is coated with a strip of transparent paint that selectively absorbs or reflects light outside of the visible range. A series of three sensors detects light absorbed or reflected from the paint to keep the moving vehicle following the paint line. The center sensor detects the paint strip. The other two sensors monitor the unpainted floor and detect when the vehicle is moving off the paint strip. They steer the vehicle back to following the paint strip. One problem with this system is that dirt on the floor makes it harder for the sensors to keep the vehicle following the paint strip because the dirt makes the paint strip harder to distinguish from the floor next to the strip.

SUMMARY OF THE INVENTION

The purpose of this invention is to solve the aforementioned problems of the conventional methods by providing a method and device for the control of a floor cleaning vehicle characterized by the fact that it is able to clean the floor at a high efficiency with an operation which is adjusted corresponding to the amount of the dirt or scratching detected on the floor.

The aforementioned purpose can be realized by an improved method of guiding a self-propelled floor cleaning vehicle equipped with a drive means, a floor cleaning means, a speed controller means that controls the speed of the drive means and a means for steering the vehicle along a preselected path defined by a guidance line on a floor surface to be cleaned, wherein the improvement comprises the steps of I. sensing a level of dirt or scratching on the floor surface over which the vehicle passes using a sensing means associated with the vehicle wherein the sensing means cooperates with the speed controller means; and II. adjusting the speed of the drive means relative to the level of dirt or scratching sensed on the floor surface over which the vehicle passes.

This invention also relates to an improved controlling system for a self-propelled floor cleaning vehicle equipped with a drive means, a floor cleaning means, a speed controller means that controls the speed of the drive means and a means for steering the vehicle along a preselected path defined by a guidance line on a floor surface to be cleaned, the improvement which comprises a sensing means associated with the vehicle for sensing a level of dirt or scratching on the floor surface over which the vehicle passes wherein the sensing means cooperates with the speed controller means to adjust the speed of the drive means relative to the level of dirt or scratching sensed on the floor surface over which the vehicle passes.

In the aforementioned configuration, the cleaning or polishing/buffing operation is performed corresponding to the amount of dirt or scratching on the floor, with more cleaning or polishing/buffing efforts performed for the sites with more significant contamination, and with less cleaning or polishing/buffing effort made for the sites with little dirt or scratching. Consequently, the floor can be completely cleaned and polished/buffed at a high efficiency in minimal time.

According to this invention, the floor cleaning vehicle has its operation controlled while the floor is being cleaned.

First of all, a material containing a light-emitting dye is applied on the floor to depict the guiding route by providing a guidance line for the vehicle to follow. The cleaning vehicle, which self-propels along the guiding route, is placed on the guidance line when the floor is to be cleaned.

Then, a light beam is emitted from the cleaning vehicle onto the floor surface. The intensity of the light from the guidance line, that is, the light generated by the guidance line surface and the light reflected from the guidance line surface, is measured.

From this measurement value, the amount of dirt or scratching on the floor is judged. The running speed of the cleaning vehicle is controlled corresponding to the degree of the dirt or scratching detected.

In the case of when the intensity of the light from the guidance line drops, the running speed of the cleaning vehicle is decreased, and the cleaning and polishing/buffing operation is performed more thoroughly. On the other hand, for the portion of the floor surface with a higher intensity of the light from the guidance line, the running speed is increased, and the cleaning and polishing/buffing operation is performed more lightly.

When the intensity of the reflected light from the floor decreases, the cleaning and polishing/buffing operation of the floor is reinforced because the vehicle automatically spends more time over those parts of the floor surface that need more work.

With the aforementioned configuration, according to this invention, the running speed of the cleaning vehicle is controlled corresponding to the amount of dirt or scratching on the floor. For a site with more dirt or scratching, cleaning and polishing is performed more thoroughly. On the other hand, for the site with less dirt, cleaning and polishing/buffing is performed more lightly. Consequently, the cleaning operation can be completely performed at a high efficiency.

In an alternative embodiment, the speed at which the rotating cleaning and polishing/buffing brush turns can also be controlled relative to the amount of dirt or scratching present to increase the speed of the brush when a section of floor having a higher level of dirt or scratching is encountered. In this way, the floor is simultaneously cleaned and scratching of the floor wax or polish is reduced by the polishing/buffing action of the brush to a greater degree than if the wheel is run at a constant speed during the cleaning operation.

In the following, this invention will be explained in more detail with reference to the Drawing Figures.

DESCRIPTION OF THE PREFERRED EMBODIMENTS

Figure 1:
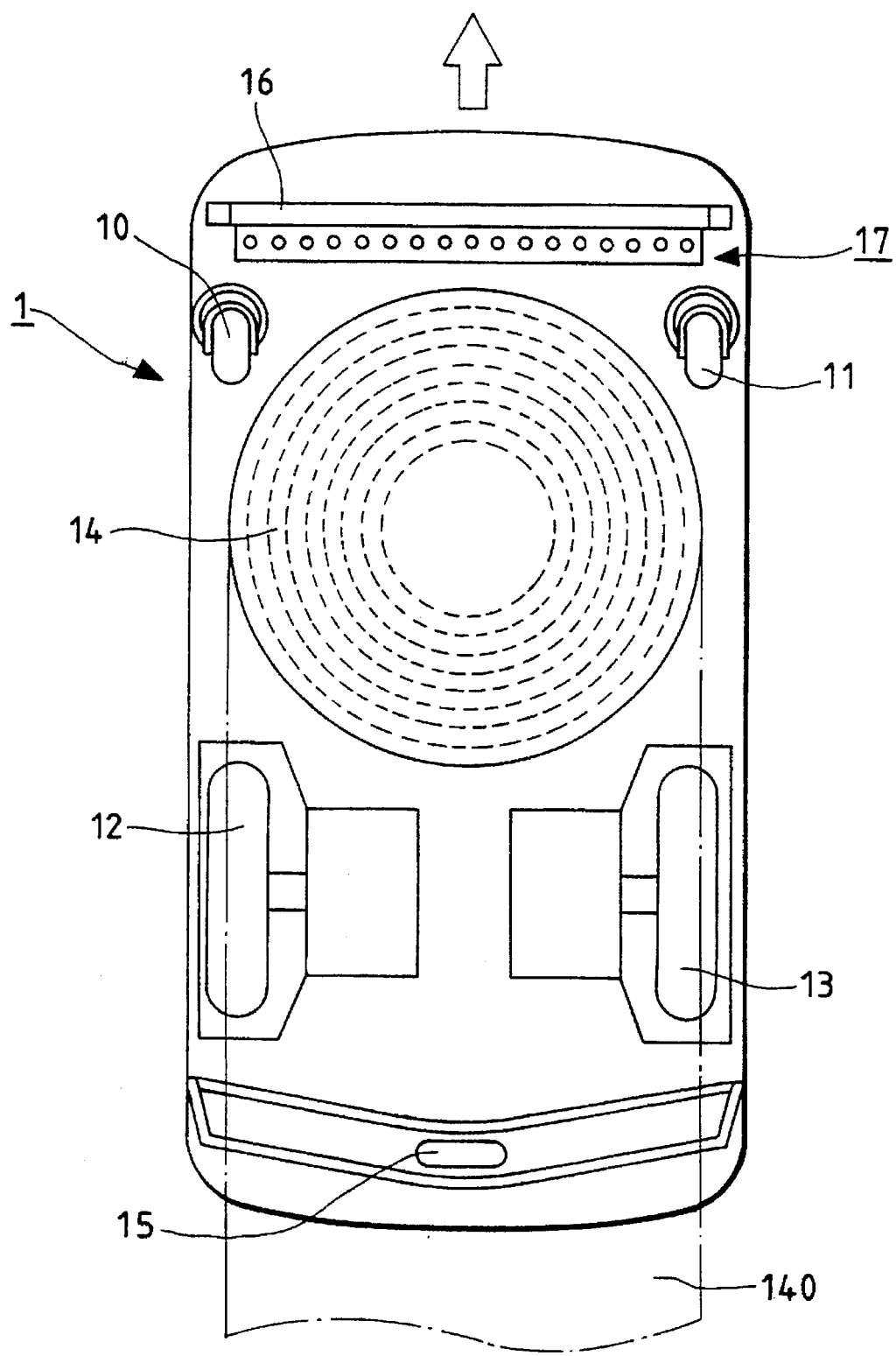
FIG. 1 is a bottom view of the cleaning vehicle equipped with the improved floor cleaning vehicle controlling device of this invention.

First of all, explanation will be made with reference to FIG. 1.

In this Figure, (1) represents the self-propelled cleaning vehicle; (10) and (11) represent casters arranged on the two sides in the front portion of the bottom surface of the cleaning vehicle (1); (12) and (13) represent drive wheels arranged on the two sides of the rear portion of the bottom surface of the cleaning vehicle (1); (14) represents a rotating brush arranged at the center of the front portion of the bottom surface of the cleaning vehicle (1); (140) represents the path of the rotating brush (14); (15) represents a sewage suction opening arranged in the rearmost portion of the bottom surface of the cleaning vehicle (1) to return used detergent to the vehicle; (16) represents a light source arranged in the front portion of the bottom surface of the cleaning vehicle (1); (17) represents a narrow light detector prepared by arranging multiple light-receiving elements (17a), (17b) at a position adjacent to the light source (16).

Cleaning vehicle (1) moves in the direction indicated by the arrow under control of drive wheels (12), (13).

Drive wheels (12), (13) are controlled independently from each other by means of a conventional drive control unit not shown in the figure.

For rotating brush (14), the detergent is fed from its center, and its rotating speed is controlled by a conventional rotating brush control unit not shown in the figure.

Sewage suction opening (15) is arranged near the floor during the cleaning operation of the cleaning vehicle (1), and it picks up the sewage (used detergent) generated during the cleaning operation.

Light source (16) emits a light beam for irradiating the floor. It has a length at least equal to the width of the track (140) of the rotating brush (14), and it is arranged at a right angle to the direction of the vehicle movement.

A sensing means which may take the form of light measurement unit (17) receives the light from the floor by means of light-receiving elements (17a), (17b). The respective light intensities received by each element (17a), (17b) are measured and compared. Corresponding to the result, command pulses are sent to the two control units for drive wheels (12), (13) and rotating brush (14).

Here, light-receiving element (17a) is located at a position facing the guiding route, while light-receiving element (17b) is located at a position facing the floor outside the guidance line.

In the following, the operation of this floor cleaning vehicle control system will be explained with reference to FIG. 2.

Figure 2:
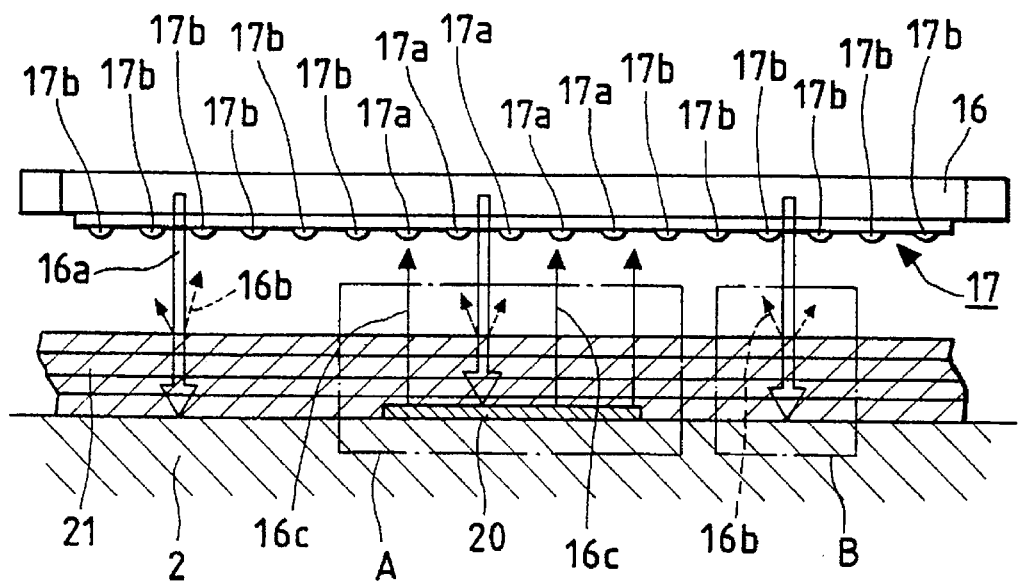
FIG. 2 is an enlarged view illustrating the front portion of the floor cleaning vehicle control device shown in FIG. 1 facing the floor.

In FIG. 2, (16a) represents the ultraviolet (UV) B light emitted from the UV light source (16); (16b) represents the reflected light of the UV light (16a) reflected from the surface of the wax layer (21) (multiple wax layers are shown) on floor surface (2); (16c) represents light emitted from guidance line (20) irradiated by the UV light; (17a) and (17b) represent light-receiving elements of the light measurement unit (17).

In the floor cleaning vehicle control device of this invention, the relative position of said floor cleaning vehicle (1) with respect to the light measurement unit (17) and the guidance line (20) is shown in FIG. 2. After the vehicle (1) is set at an appropriate starting point for cleaning on the floor surface (2), it is turned on. Optionally, the area where vehicle (1) is started should be clean so vehicle (1) starts with a clean initial reference point.

When the cleaning vehicle (1) is set on the floor surface (2) and started for the cleaning operation, light source (16) emits UV light (16a) that is emitted or irradiated onto the floor surface (2).

In light measurement unit (17), five light-receiving elements (17a) for receiving light (16c), that is, light from the guidance line (20), are arranged on the side facing the guidance line (20), and 6 light-receiving elements (17b) for receiving reflected light (16b) reflected from the surface of wax layer (21) alone, that is, the reflected light (16b) from the floor surface alone, are arranged on the side facing the floor surface (2) outside the guidance line (20) coated with the light-emitting dye. The aforementioned light-receiving elements are arranged with a preselected distance between one another.

Guidance line (20) is formed by coating a floor wax or polish containing a UV absorptive dye that can emit light of a second wavelength under irradiation by UV light (16a) of a first wavelength on the floor surface (2). Floor wax or polish layer (21) contains no UV absorptive dye, and it is coated on the entire surface (20) of the floor.

When the wax layer (21) is not contaminated, a portion of UV light (16a) irradiated from the light source (16) is reflected from the surface of the wax layer (21), and all of the light-receiving elements (17a), (17b) receive light (16b).

Other UV light (16a) propagates in the wax layer (21) towards the floor surface (2) or the guidance line (20). As UV light (16a) reaches the guidance line (20), light (16c) is emitted with an intensity corresponding to the dose of UV light (16a) that reaches the guidance line (20).

Figure 3:
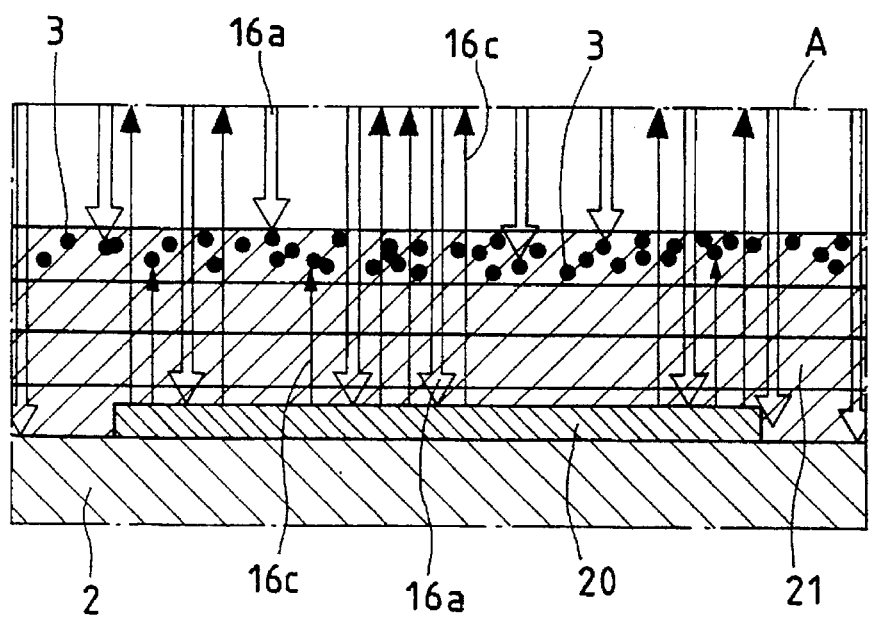
FIG. 3 is an enlarged view illustrating the portion indicated by frame A in FIG. 2.

FIG. 3 is a diagram illustrating the configuration of propagation of UV light (16a) and light (16c) when dirt (3) enters the surface layer of wax layer (21). It is understood that the dirt is often simply coated on top of the wax-coated floor surface (2) although, for illustration, dirt (3) is only shown as being embedded in the wax (21).

In FIG. 3, reflected light (16b) is omitted. However, when UV light (16a) hits the outer layer of the wax layer (21), a portion of the UV light (16a) becomes reflected light (16b).

When there is dirt (3) present, UV light (16a) irradiated from the light source (16) is blocked by the dirt (3), and the intensity of UV light (16a) that can reach the guidance line (20) decreases. Consequently, the light (16c) becomes weaker. In addition, the light (16c) is attenuated by the dirt (3) before it can reach the light-receiving elements (17a), (17b). Consequently, the intensity of light (16c) decreases as the amount of dirt (3) blended in (coated over) the wax layer (21) is increased.

In the preferred embodiment shown, the light from the guidance line (20) and the reflected light from the floor generated as described above is received by the light-receiving elements (17a), (17b), respectively, and their intensities are measured. Among the measurement results, the measurement values of the light-receiving elements (17a), (17b) receiving the light of the guidance line (20) are greater than those receiving the light reflected from the floor.

From the measurement data, a judgment is made on whether the light-receiving elements (17a), (17b) received the light of the guidance line (20). This information can be used to steer vehicle (1) along the route set by guidance line (20).

As a result, when the light from guidance line (20) is received by the light-receiving elements (17a), the control unit of the drive wheels (12) and (13) guide the cleaning vehicle (1) in a straight forward movement. When the path of the cleaning vehicle (1) deviates from the guidance line (20), the light from the guidance line (20) is received by light-receiving elements (17b) on one side. In this case, the ratio of the rotating speed of drive wheel (12) to that of drive wheel (13) is controlled, and the path of the cleaning vehicle is corrected to compensate for the aforementioned deviation. As a result, the cleaning vehicle (1) can follow the guidance line (20).

Also, the light measurement unit compares the mean value of the intensity of the light from the guidance line (20) received by the light-receiving elements (17a) for each light-receiving element with the mean value of the intensity of the reflected light from the floor received by light-receiving elements (17b) for each light-receiving element. When the difference increases, the movement speed of the cleaning vehicle (1) is increased correspondingly. On the other hand, when the difference shrinks, the movement speed of the cleaning vehicle is reduced by sending the corresponding command to the control unit of the drive wheels (12), (13). Consequently, for the portion with more dirt (3) in the wax layer (21), the cleaning operation can be performed for a longer period of time.

Figure 4:
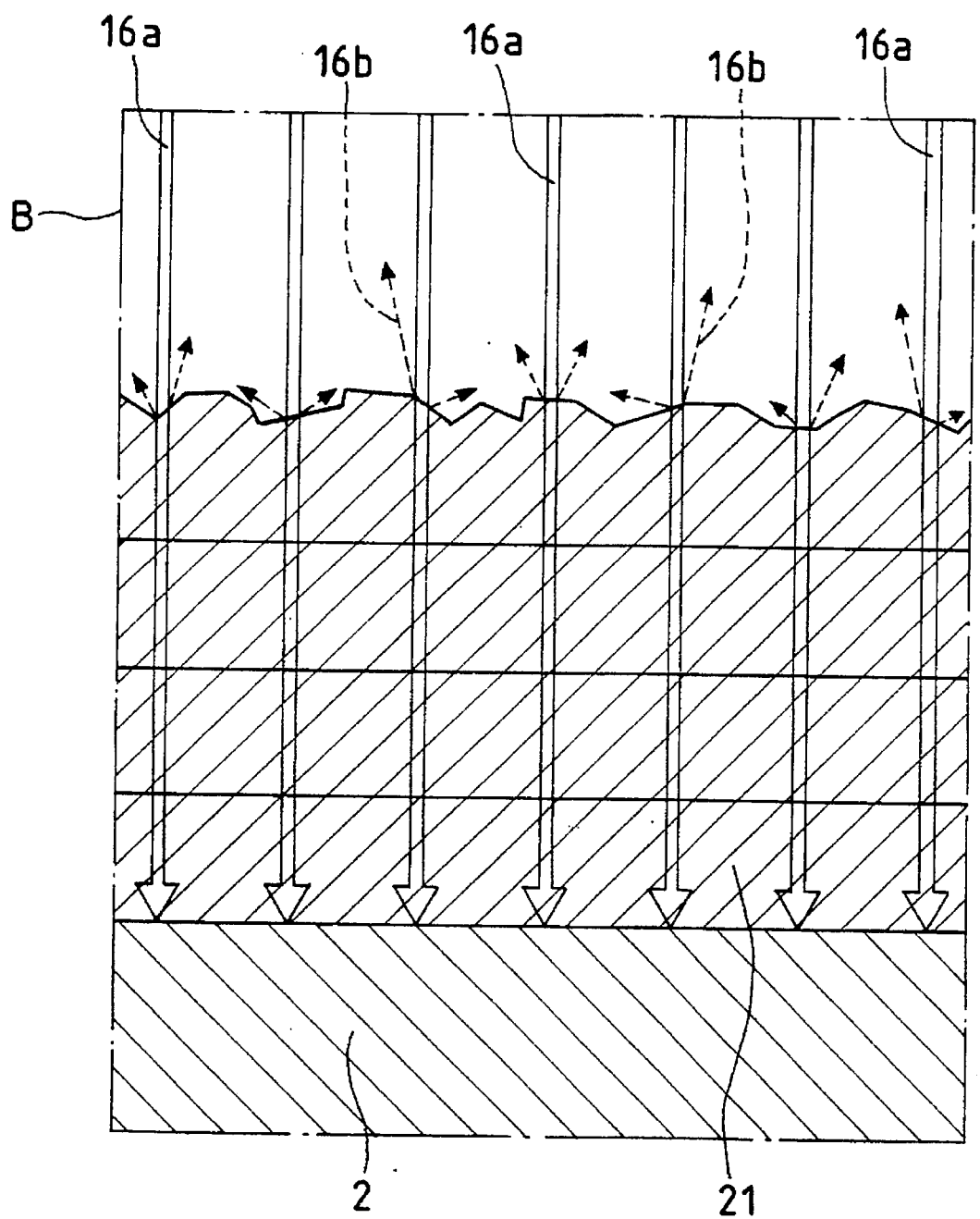
FIG. 4 is an enlarged view illustrating the portion indicated by frame B in FIG. 2.

When multiple scratches are formed on the surface of the wax layer (21) so that it becomes dull, as is shown in FIG. 4, UV light (16a) is scattered, and the reflected light (16b) reaching the light-receiving elements (17a), (17b) becomes weaker.

In this case, a command corresponding to an increase of the rotating speed of rotating brush (14) is sent to the rotating brush control unit, so that the surface scratches of the wax layer (21) are removed by the polishing/buffing action of the wheel to restore the gloss.

In addition, in this device, as the light measurement unit (17) and the rotating brush (14) are separated from one another, when the light measurement unit (17) detects the portion where the floor becomes dull due to the presence of dirt (3), the running speed of the cleaning vehicle (1) and the rotating speed of the rotating brush (14) should be controlled appropriately when the aforementioned portion comes exactly underneath the rotating brush (14).

Figure 5:
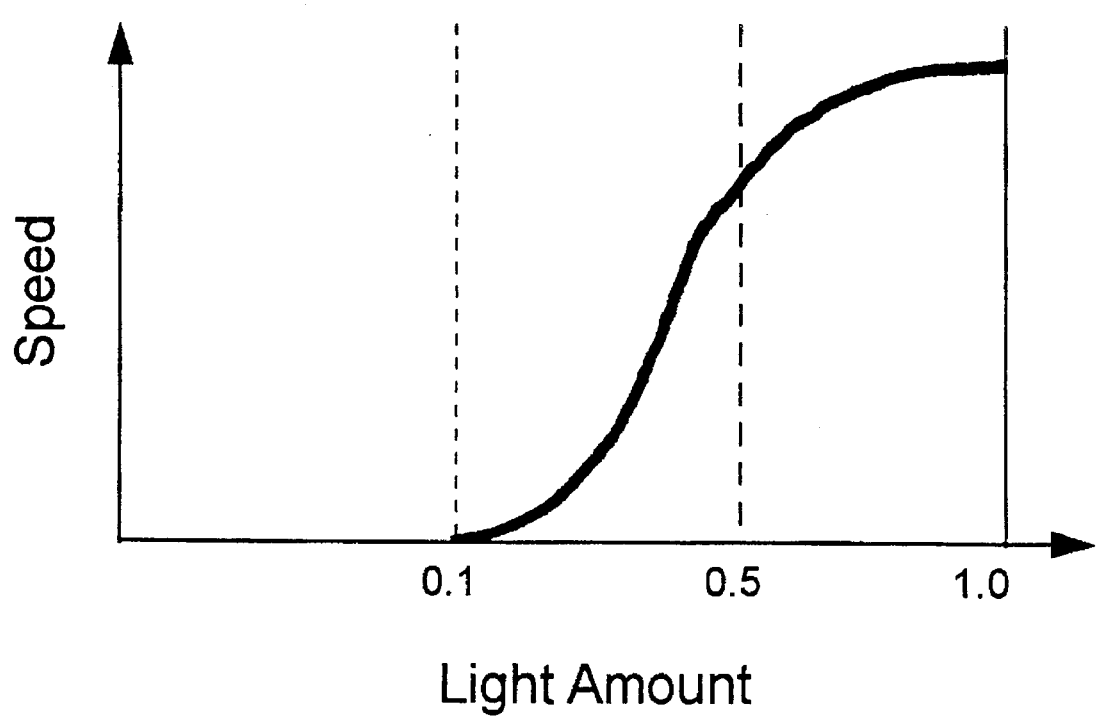
FIG. 5 is a simplified graph of the relationship between the traveling speed of the vehicle and the amount of light received by the light measurement unit.

FIG. 5 describes the general relationship between the traveling speed of the cleaning vehicle (1) and the amount of light received by the light measurement unit (17) in units wherein a value of "1.0" means the maximum amount of light returning from the guidance line (20) from the light source (16) and a value of "0.0" means essentially no light from light source (16) is reflected back to the light measurement unit (17). Thus, a value of 1.0 means that the floor is completely clean.

The relationship between the amount of light actually received and the cleaning vehicle speed at a given amount of light received is experimentally determined depending upon the type of floor to be cleaned. The appropriate values are programmed into and stored in an appropriate conventional controller means within the cleaning vehicle (1) that interfaces between the light measurement unit (17) and the drive wheels (12), (13) and another such controller is similarly programmed so that it interfaces between the light measurement unit (17) and the rotating brush (14) to control the speed of the rotating brush (14).

As shown in FIG. 5, the cleaning vehicle is in essentially normal speed operation when the light values received range between 0.4 and 1.0 with the speed decreased somewhat as the value of 0.4 is approached. When the light received is small, such as at 0.2, the speed of the cleaning vehicle (1) is considerably reduced so that a long washing time is given to the portion of the floor where such a value is received.

In one embodiment of the present invention, when the amount of light received is very small, such as under 0.1, then the machine is programmed to stop and manual washing is required.

If the receipt of light abruptly becomes 0.0, for example because of the existence of adhesive tape or other debris on the floor, the controller is programmed to cause the cleaning to advance a few centimeters to determine if the light value returns to a higher range. If it does not, then the machine can be programmed to stop for manual cleaning of the floor.

Also, it is preferred that a shade or shield extending downward towards the floor for preventing external light from entering the light-receiving elements be arranged on the periphery of the light-receiving elements.

This invention is not limited to the aforementioned application examples. For example, as described more fully in the Azumi and Sado U.S. Patent Application noted above, it is possible to use light other than UV light emitted from a light source for irradiation. An infrared (IR) absorptive dye or a visible light absorptive dye may also be used as the light-emitting dye in conjunction with an appropriate light receiver unit. Also, the light-emitting dye may be dissolved in a solvent for direct coating on the floor. There may also be less than three layers or more than five layers of floor wax or polish coated as thin layers on the floor.

Also, as far as the main points of this invention are observed, it is possible to freely make changes in the design for the numbers, positions, shapes, etc. of the casters, rotating brushes, light sources, light measurement units, light-receiving elements, drive wheels, etc. All of the modifications that can be accomplished by persons of ordinary skill in the relevant art are encompassed by this invention.

INDUSTRIAL APPLICABILITY

With the aforementioned configuration, this invention provides a way to clean the floor well in minimal time without any waste, as the operation is performed corresponding to the amount of dirt or scratching on the floor.

EXPLANATION OF DRAWING REFERENCE NUMERALS

| | |
|---|---|
| 1 | cleaning vehicle |
| 2 | floor surface |
| 3 | dirt |
| 10 | caster |
| 11 | caster |
| 12 | drive wheel |
| 13 | drive wheel |
| 14 | rotating brush |
| 140 | path of rotating brush |
| 15 | sewage suction opening |
| 16 | light source |
| 16a | UV light |
| 16b | reflected light |
| 16c | light |
| 17 | light measurement unit |
| 17a | light-receiving element |
| 17b | light-receiving element |
| 20 | guidance line |
| 21 | wax layer |
| A | frame |
| B | frame |

That which is claimed is:

1. In an improved controlling system for a self-propelled floor cleaning vehicle equipped with a drive means for driving said vehicle, a floor cleaning means, a speed controller means that controls the speed of the drive means and a means for steering the vehicle along a preselected path defined by a guidance line on a floor surface to be cleaned, the improvement which comprises a sensing means associated with the vehicle for sensing a level of dirt or scratching on the floor surface over which the vehicle passes wherein the sensing means cooperates with the speed controller means to adjust the speed of the drive means relative to the level of dirt or scratching sensed on the floor surface over which the vehicle passes.

2. The improved system of claim 1 wherein the sensing means comprises a light source directed at the floor surface and a light receiving means oriented to receive reflected light from the floor surface so that the intensity of reflected light from the floor surface can be measured and correlated with the level of dirt or scratching present on the floor surface.

3. The improved system of claim 2 wherein the light source emits light of a first wavelength that is capable of exciting a luminous material located on the floor surface to emit light of a second wavelength wherein the intensity of the light of the second wavelength reflected from the floor surface is measured by the light receiving means.

4. The improved system of claim 3 wherein the guidance line contains the luminous material, the light receiving means comprises more than one light-receiving element and each light-receiving element is positioned on the vehicle to receive reflected light from the guidance line.

5. The improved system of claim 4 wherein the light receiving means also cooperates with the steering means to cause the vehicle to follow the guidance line by steering the vehicle so that it maintains the light receiving elements over the guidance line.

6. The improved system of claim 5 wherein the floor cleaning means has a speed controlling means and the sensing means also cooperates with the speed controlling means of the floor cleaning means to adjust the speed of floor cleaning means relative to the level of dirt or scratching sensed on the floor surface over which the vehicle passes.

7. The improved system of claim 4 wherein the light receiving means further comprises, in addition to the light-receiving elements that are to receive reflected light from the guidance line, at least one light receiving element on each side of the guidance line that is to receive reflected light from the floor surface that is not covered by the guidance line and wherein the intensity of the light received from the guidance line is compared with the intensity of the light received from the other light-receiving elements and the steering means is controlled by this comparison to correct the travel of the vehicle.

8. The improved system of claim 7 wherein the light receiving means also cooperates with the steering means to steer the vehicle so that it maintains those light receiving elements that are to receive light from the guidance line over the guidance line and thus causes the vehicle to follow the guidance line.

9. The improved system of claim 7 wherein the floor cleaning means has a speed controlling means and the sensing means also cooperates with the speed controlling means of the floor cleaning means to adjust the speed of floor cleaning means relative to the level of dirt or scratching sensed on the floor surface over which the vehicle passes.

10. The improved system of claim 4 wherein the floor cleaning means has a speed controlling means and the sensing means also cooperates with the speed controlling means of the floor cleaning means to adjust the speed of floor cleaning means relative to the level of dirt or scratching sensed on the floor surface over which the vehicle passes.

11. The improved system of claim 3 wherein the floor cleaning means has a speed controlling means and the sensing means also cooperates with the speed controlling means of the floor cleaning means to adjust the speed of floor cleaning means relative to the level of dirt or scratching sensed on the floor surface over which the vehicle passes.

12. The improved system of claim 1 wherein the floor cleaning means has a speed controlling means and the sensing means also cooperates with the speed controlling means of the floor cleaning means to adjust the speed of floor cleaning means relative to the level of dirt or scratching sensed on the floor surface over which the vehicle passes.

13. In an improved method of guiding a self-propelled floor cleaning vehicle equipped with a drive means for driving said vehicle, a floor cleaning means, a speed controller means that controls the speed of the drive means and a means for steering the vehicle along a preselected path defined by a guidance line on a floor surface to be cleaned, the improvement which comprises the steps of (I.) sensing a level of dirt or scratching on the floor surface over which the vehicle passes using a sensing means associated with the vehicle wherein the sensing means cooperates with the speed controller means; and (II.) adjusting the speed of the drive means relative to the level of dirt or scratching sensed on the floor surface over which the vehicle passes.

14. The improved method of claim 13 wherein the sensing means comprises a light source directed at the floor surface, a light receiving means oriented to receive reflected light from the floor surface at which the light is directed and a means by which the intensity of reflected light from the floor surface is compared with the intensity of the light source to determine the level of dirt or scratching present on the floor surface and Step (I) comprises (A.) directing the light source at the floor surface;

(B.) measuring the intensity of reflected light from the floor surface; and (C.) correlating the intensity of the reflected light with the level of dirt or scratching present on the floor surface.

15. The improved method of claim 14 wherein the light source emits light of a first wavelength that is capable of exciting a luminous material located on the floor surface to emit light of a second wavelength and Step (I)(B) comprises measuring the intensity of the light of the second wavelength reflected from the floor surface.

16. The improved method of claim 15 wherein the guidance line contains the luminous material, the light receiving means comprises more than one light-receiving element, each light-receiving element is positioned on the vehicle to receive reflected light from the guidance line and Step (I)(B) comprises the steps of (1.) measuring the intensity value of the light reflected to each light-receiving element; and (2.) averaging the intensity values obtained to obtain an average intensity value of the reflected light from the floor surface.

17. The improved method of claim 16 wherein the light receiving means also cooperates with the steering means and, simultaneously with Steps (I) and (II), the following steps are carried out (III.) comparing the intensity of the light detected by each of the light-receiving elements; and (IV.) steering the vehicle to follow the guidance line when the intensity of the reflected light received by at least one of the light-receiving elements changes significantly relative to the intensity values measured by the other light-receiving elements.

18. The improved method of claim 16 wherein the light receiving means further comprises, in addition to the light-receiving elements that are to receive reflected light from the guidance line, at least one light-receiving element on each side of the guidance line that is to receive reflected light from the floor surface that is not covered by the guidance line and wherein Step (I)(B) and (I)(C) comprise (1.) measuring the intensity of the light reflected to each light receiving element located above the guidance line;

(2.) averaging the intensity value received in Step I(B)(1) to obtain an average intensity value of the reflected light from the guidance line on the floor surface;

(3.) measuring the intensity of the light reflected to each light receiving element located on the sides of the guidance line;

(4.) averaging the intensity value received in Step I(B)(3) to obtain an average intensity value of the reflected light from the floor surface outside of the guidance line; and (5.) comparing the average intensity value of the reflected light from the guidance line with the average intensity value of the reflected light from the floor surface outside of the guidance line to obtain an intensity value difference; and (C.) correlating the intensity value difference with the level of dirt or scratching present on the floor surface.

19. The improved method of claim 18 wherein the light receiving means also cooperates with the steering means and, simultaneously with Steps (I) and (II), the following steps are carried out (III) comparing the average intensity of the light detected by the light-receiving elements situated over the guidance line with the average intensity of the light-receiving elements located each side of the guidance line; and (IV.) steering the vehicle to follow the guidance line when the intensity of the reflected light received by the light-receiving elements situated over the guidance line changes significantly relative to the intensity value received by the other light-receiving elements situated to be on one side or the other of the guidance line.

* * * * *